(No Model.)
T. KARUTZ.
DEVICE FOR DRYING AND PERFORATING CIGAR TIPS.
No. 360,302. Patented Mar. 29, 1887.
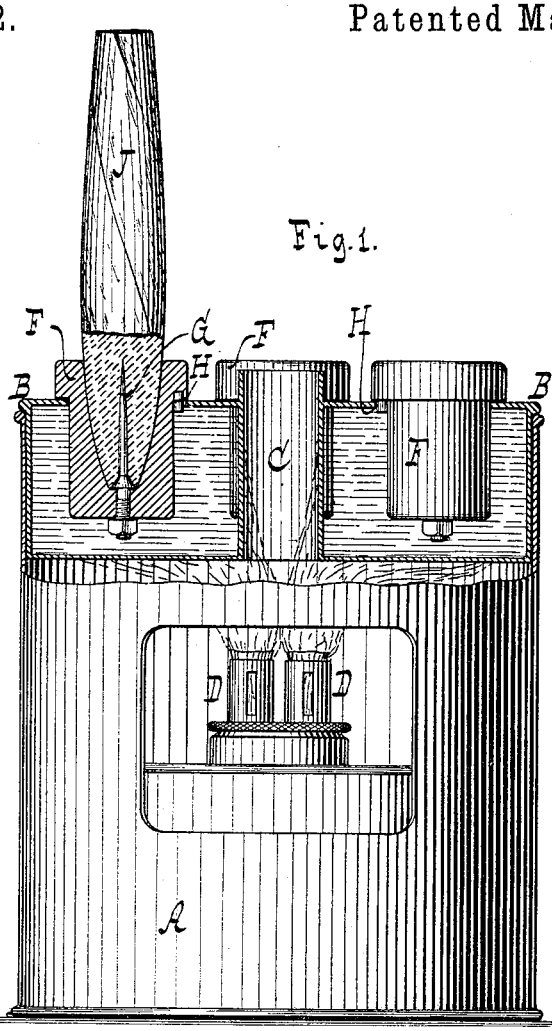
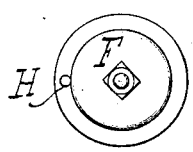
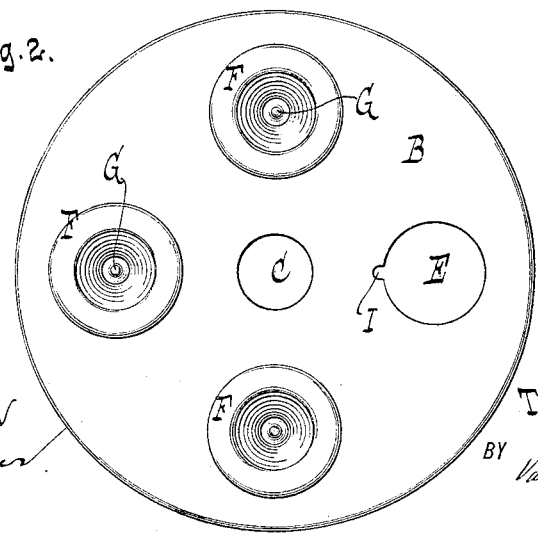
WITNESSES:
INVENTOR
Traugott Karutz
BY
Van Santvoord & Hauff
ATTORNEYS

UNITED STATES PATENT OFFICE.

TRAUGOTT KARUTZ, OF BROOKLYN, NEW YORK.

DEVICE FOR DRYING AND PERFORATING CIGAR-TIPS.

SPECIFICATION forming part of Letters Patent No. 360,302, dated March 29, 1887.

Application filed December 9, 1886. Serial No. 221,127. (No model.)

*To all whom it may concern:*

Be it known that I, TRAUGOTT KARUTZ, a citizen of the United States, residing at Brooklyn, in the county of Kings and State of New York, have invented new and useful Improvements in Devices for Drying and Perforating Cigar-Tips, of which the following is a specification.

This invention relates to a device for drying and perforating cigar-tips, as fully set forth in the following specification and claim, and illustrated in the accompanying drawings, in which—

Figure 1 is a side elevation of the device, partly in section. Fig. 2 is a plan view thereof. Fig. 3 is an inverted plan view of a header. Fig. 4 is a side elevation, partly in section, of a cigar with a perforated tip.

Similar letters indicate corresponding parts.

In the drawings, A is a heating-chamber containing a source of heat, D, such as a lamp-flame. To secure a sufficiently high degree of heat to dry the cigar-tips, but not sufficiently high to burn the tips, a water-containing vessel, B, is set within the top part of the heater A. To allow the products of combustion to escape, a passage or chimney, C, composed of a tube, passes vertically through the water-vessel, the lower end of the tube being attached to and opening through the bottom wall of the water-vessel.

The top wall of the water-containing vessel is provided with openings E, for the reception of the headers F. Suitable rims or ledges on the headers F support the headers upon the edges of the openings E. Lugs or projections H on the headers F engage suitable recesses, I, in the water-vessel and prevent the headers from turning in the openings E. The headers F are provided with needles or prongs G, as shown.

The vessel B, instead of being filled with water, may of course be filled with any other suitable fluid—such, for example, as oil. The hot fluid B will cause the headers F and prongs G to be heated to such a degree as to dry a cigar-tip which is inserted in the header. Such insertion of a cigar-tip will cause the prong G to perforate or pierce the tip, and the hot prong and hot header will dry the cigar-tip. Such drying of the tip will prevent the perforation made by the prong G in the tip from closing after the tip has been withdrawn from the header.

I am aware that cigars have been headed by means of a properly-shaped metallic cup set into an opening in the top of a hot-water vessel, the cup being set firmly in the vessel and prevented from turning round by means of a rib on one side; and I am also aware that cigar-headers or cup-shaped dies have been provided with central prongs or pins to perforate the cigar-tip. These, however, I do not broadly claim.

What I claim as new, and desire to secure by Letters Patent, is—

The combination of the heating-chamber A, the water-vessel B, fitted within the upper part of said chamber and provided with openings E, having lateral recesses I, the cigar-headers F, having lugs H, fitted into said recesses, said headers being provided with prongs G, and the central chimney, C, extending through the water-vessel and communicating with the heating-chamber to remove the products of combustion, substantially as shown and described.

In testimony whereof I have hereunto set my hand and seal in the presence of two subscribing witnesses.

TRAUGOTT KARUTZ. [L. S.]

Witnesses:
W. HAUFF,
E. F. KASTENHUBER.